US011735861B2

(12) United States Patent
Chang et al.

(10) Patent No.: US 11,735,861 B2
(45) Date of Patent: Aug. 22, 2023

(54) SOCKET STRUCTURE AND PORTABLE ELECTRONIC DEVICE

(71) Applicant: PEGATRON CORPORATION, Taipei (TW)

(72) Inventors: Chun-Fu Chang, Taipei (TW); I-Tien Hsieh, Taipei (TW); Hui-Chen Wang, Taipei (TW)

(73) Assignee: PEGATRON CORPORATION, Taipei (TW)

( * ) Notice: Subject to any disclaimer, the term of this patent is extended or adjusted under 35 U.S.C. 154(b) by 365 days.

(21) Appl. No.: 17/233,292

(22) Filed: Apr. 16, 2021

(65) Prior Publication Data
US 2021/0384670 A1 Dec. 9, 2021

(30) Foreign Application Priority Data

Jun. 4, 2020 (TW) ................................ 109118802

(51) Int. Cl.
G06F 1/16 (2006.01)
H01R 13/627 (2006.01)
H01R 25/00 (2006.01)
H01R 13/518 (2006.01)

(52) U.S. Cl.
CPC ....... H01R 13/6273 (2013.01); G06F 1/1681 (2013.01); H01R 13/518 (2013.01); H01R 25/006 (2013.01); H01R 2201/06 (2013.01)

(58) Field of Classification Search
CPC . H01R 13/6273; G06F 1/1681; G06F 1/1632; G06F 1/1633; G06F 1/1637; G06F 1/1654; G06F 1/1675; G06F 1/1679
See application file for complete search history.

(56) References Cited

U.S. PATENT DOCUMENTS

| 5,580,182 A * | 12/1996 | Lin | H01R 13/6275 292/228 |
| 5,997,323 A * | 12/1999 | Youn | G06F 1/1632 439/157 |
| 9,141,146 B2 * | 9/2015 | Ke | G06F 1/1679 |
| 9,601,935 B2 * | 3/2017 | Suzuki | G06F 1/1654 |
| 10,323,438 B2 * | 6/2019 | Chang | E05B 65/0811 |

FOREIGN PATENT DOCUMENTS

CN 101661771 3/2010

* cited by examiner

Primary Examiner — Vanessa Girardi
(74) Attorney, Agent, or Firm — J.C. Patents

(57) ABSTRACT

A socket structure includes a casing, a switch, a linkage, a first hook, a gear, a rotating arm, and a second hook. The switch is exposed from the casing and disposed movably to the casing along a first direction or a second direction. The linkage is located in the casing and linked to the switch, and has a rack. The first hook is exposed from the casing and linked to the linkage. The gear is located in the casing and engages with the rack. The rotating arm having one end pivotally connected to the gear is located in the casing. The second hook is exposed from the casing and linked to the other end of the rotating arm. When the switch moves along the first direction, the linkage drives the first hook to move, the gear drives the rotating arm, and the second hook moves to an unlocked position.

22 Claims, 14 Drawing Sheets

SOCKET STRUCTURE AND PORTABLE ELECTRONIC DEVICE

CROSS-REFERENCE TO RELATED APPLICATION

This application claims the priority benefit of Taiwan application serial no. 109118802, filed on Jun. 4, 2020. The entirety of the above-mentioned patent application is hereby incorporated by reference herein and made a part of this specification.

BACKGROUND

Technical Field

The disclosure relates to a socket structure and an electronic device, and particularly to a socket structure capable of fixing an inserted object stably and a portable electronic device having the same.

Description of Related Art

Currently, there are laptops whose screen can be detached from its lower body. The detachable screen of such device can be used as a tablet computer. When installed on the lower body, the screen is fixed to the lower body through one hook or two hooks that move in the same direction. However, such fixing method makes the screen more difficult to be fixed stably with the lower body, and it is prone to be shaky.

SUMMARY

The present disclosure provides a socket structure having two hooks that are capable of moving in the opposite direction and are controlled by the same switch.

A socket structure of the present disclosure includes a casing, a switch, a linkage, a first hook, a gear, a rotating arm, and a second hook. The switch is exposed from the casing and movably disposed in the casing along a first direction or a second direction. The linkage is located in the casing and linked to the switch, and has a rack. The first hook is exposed from the casing and linked to the linkage. The gear is located in the casing and engages with the rack. The rotating arm is located in the casing, and one end of the rotating arm is pivotally connected to the gear. The second hook is exposed from the casing and linked to the other end of the rotating arm. When the switch moves along the first direction, the linkage moves correspondingly along the first direction, so that the first hook is driven to move alone the first direction, and the gear rotates with a movement of the rack of the linkage, driving the rotating arm to move, so that the second hook moves toward the second direction, such that the first hook and the second hook move from a fixed position to an unlocked position.

In an embodiment of the present disclosure, the above-mentioned first hook and second hook respectively have two extending bottom plates, and the socket structure further includes two pogo pins, which are located in the casing and respectively abut against the two extending bottom plates.

In an embodiment of the present disclosure, the above-mentioned two extending bottom plates respectively have two holes. When the two pogo pins are pressed in a vertical direction and the first hook and the second hook are moved to the unlocked position, the two extending bottom plates move relative to the two pogo pins, so that the two holes are moved to the positions corresponding to the two pogo pins, and the two pogo pins extend into the two holes.

In an embodiment of the present disclosure, when the two pogo pins move upward, which is the opposite direction in the vertical direction, the two pogo pins leave the two holes, the first hook moves in the second direction, and the second hook moves in the first direction, the gear rotates with a movement of the rotating arm, driving the rack to move, and the first hook and the second hook move from the unlocked position to the fixed position.

In an embodiment of the present disclosure, the above-mentioned socket structure further includes a first guiding plate and a first guiding block, in which the first guiding plate is connected to the first hook, and the first guiding plate has a first guiding groove, and the first guiding block is fixed to the casing and extends into the first guiding groove.

In an embodiment of the present disclosure, the above-mentioned socket structure further includes a second guiding plate and a second guiding block, in which the second guiding plate is connected to the second hook, the second guiding plate has a second guiding groove, and the second guiding block is fixed to the casing and extends into the second guiding groove.

In an embodiment of the present disclosure, the aforementioned linkage includes an opening, the first hook has an extending bottom plate located in the opening, and the extending bottom plate abuts against the linkage.

In an embodiment of the present disclosure, the other end of the aforementioned rotating arm is fixed to the second hook, or the other end of the rotating arm is integrated with the second hook.

In an embodiment of the present disclosure, the above-mentioned socket structure further includes two elastic members, in which one of the elastic members is connected between the casing and the first hook to provide an elastic force along the second direction, and the other elastic member is connected between the casing and the second hook to provide an elastic force along the first direction.

In an embodiment of the present disclosure, the above-mentioned socket structure further includes an electrical connector exposed from the casing.

In an embodiment of the present disclosure, the aforementioned socket structure further includes a hinge assembly disposed in the casing.

A portable electronic device of the present disclosure includes a lower body, the aforementioned socket structure, and an upper body. The socket structure is connected to the lower body, the upper body is disposed detachably in a groove of the socket structure, and the first hook and the second hook are suitable for being buckled or detached from the upper body.

Based on the above, the switch of the socket structure of the portable electronic device of the present disclosure is linked to the first hook through the linkage, so that the first hook is capable of moving in the same direction with the switch. Also, through the rack on the linkage, the gear engaged with the rack, and the rotating arm pivoted to the gear, the switch drives the second hook to move in the opposite direction with the switch. This way, the socket structure of the present disclosure is capable of controlling the first hook and the second hook to move in opposite direction with a single switch, which is a configuration not only facilitating the operation of users, but also providing a two-way fixation to improve the fixation.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

Figure 1:
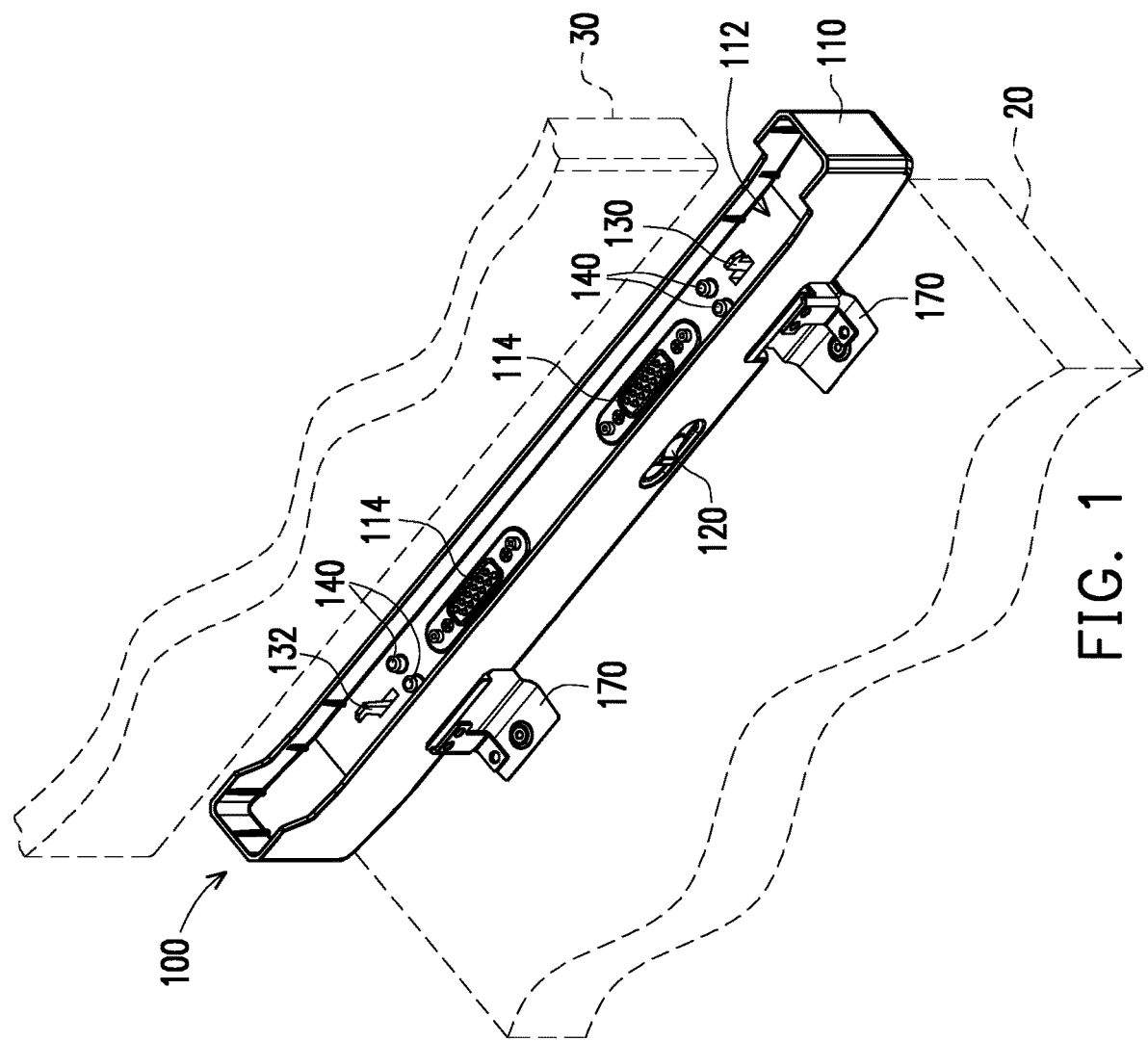
FIG. 1 is a partial schematic view of a portable electronic device according to an embodiment of the disclosure.

FIG. 1 is a partial schematic view of a portable electronic device according to an embodiment of the disclosure. In this embodiment of FIG. 1, a portable electronic device 10 includes a lower body 20, a socket structure 100, and an upper body 30. The socket structure 100 is connected to the lower body 20, and the upper body 30 is disposed detachably in the socket structure 100. The upper body 30 is, for example, an electronic device, such as a tablet computer or a mobile phone. The socket structure 100 includes an electrical connector 114 exposed in a groove 112, and is suitable for electrically connecting with the upper body 30 provided in the groove 112. In addition, the socket structure 100 includes a hinge assembly 170 disposed in the casing 110, and the hinge assembly 170 is adapted to be connected to the lower body 20, so that the socket structure 100 may rotate relative to a keyboard module, thus enabling the upper body 30 that is installed in the socket structure 100 to change the angle relative to the keyboard module. Of course, the application of the socket structure 100 is not limited thereto.

In this embodiment, the socket structure 100 includes a structure capable of fixing the upper body 30 within the groove 112, whose details are described below.

Figure 2:
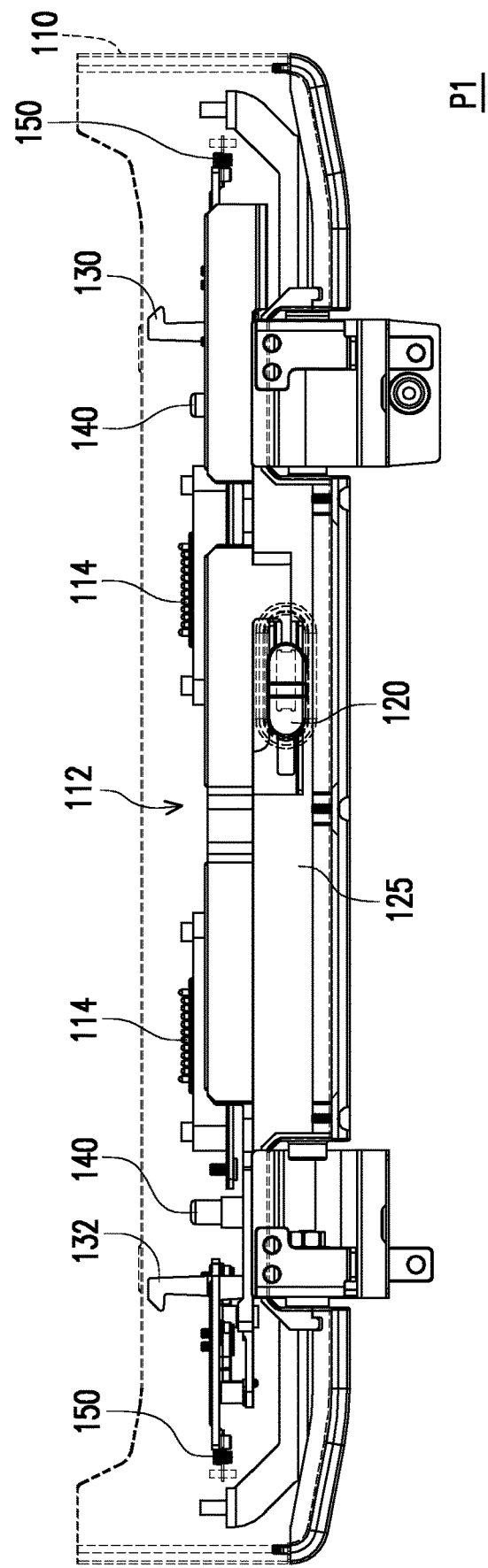
FIG. 2 is a schematic front view of the switch of the socket structure of FIG. 1 in a fixed position.
Figure 3:
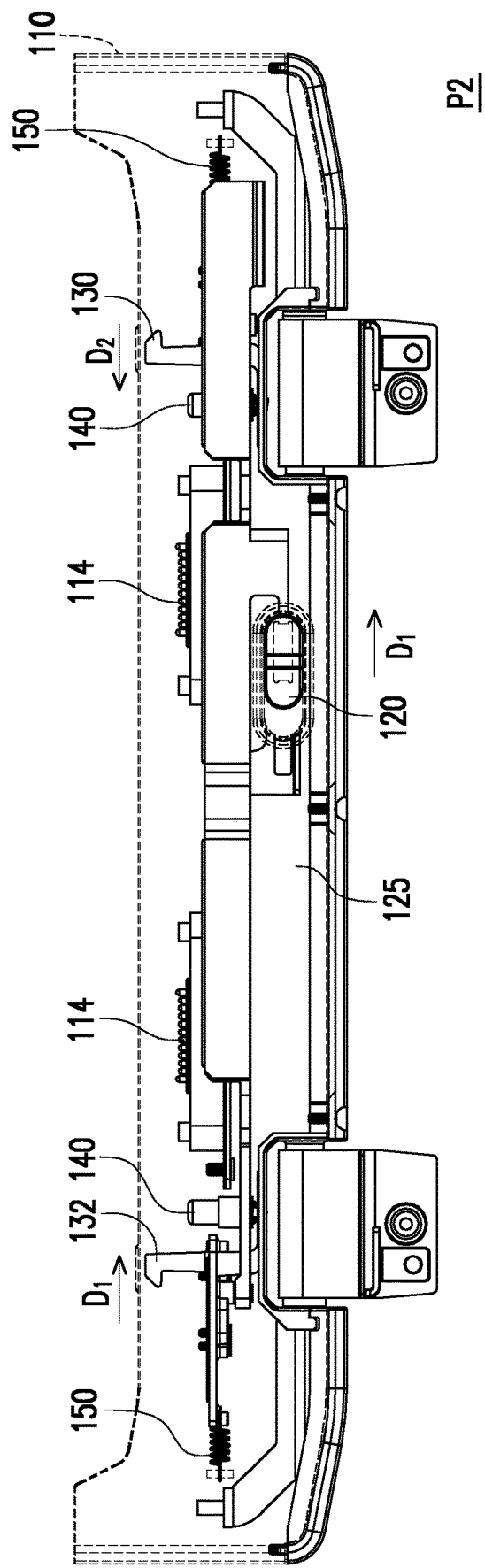
FIG. 3 is a schematic front view of the switch of the socket structure of FIG. 1 in an unlocked position.

FIG. 2 is a schematic front view of the switch of the socket structure of FIG. 1 in a fixed position. FIG. 3 is a schematic front view of the switch of the socket structure of FIG. 1 in an unlocked position. Note that in order to see the internal structure clearly, the casing 110 is represented by dashed lines. Please refer to FIG. 2 and FIG. 3. In this embodiment, the socket structure 100 includes a casing 110, a switch 120, a first hook 132, and a second hook 130. The switch 120 is exposed and disposed movably to the casing 110. The first hook 132 and the second hook 130 are exposed in the groove 112, and the first hook 132 and the second hook 130 are suitable for being buckled or detached from an upper body 30.

In this embodiment, the first hook 132 and the second hook 130 are disposed reversely, the first hook 132 is linked to the switch 120 in the same manner as the direction in which the switch 120 moves, and the second hook 130 is linked to the switch 120 in a manner opposite to the direction in which the switch 120 moves. Therefore, as shown in FIG. 3, when the switch 120 moves in a first direction D1, the first hook 132 moves correspondingly in the first direction D1, and the second hook 130 moves in a second direction D2. The first direction D1 is opposite to the second direction D2.

This way, the socket structure 100 of the present disclosure is capable of controlling the first hook 132 and the second hook 130 to move in opposite direction with the single switch 120, which is a configuration not only facilitating the operation of users, but also providing a two-way fixation to improve the fixation. Specifically, when the upper body 30, for example as a tablet computer, is inserted into the groove 112 of the socket structure 100, the first hook 132 and the second hook 130 may extend into the two corresponding holes of the upper body 30, and enact as shown in FIG. 3 to FIG. 2, where the first hook 132 and the second hook 130 move to a fixed position P1 on both sides, so that the first hook 132 and the second hook 130 buckle the upper body 30, so that the upper body 30 does not fall out easily from the groove 112 of the socket structure 100. When the upper body 30 is prepared to leave the groove 112 of the socket structure 100, the switch 120 may be moved as enacted from FIG. 2 to FIG. 3, so that the first hook 132 and the second hook 130 move inward to an unlocked position P2.

In addition, the socket structure 100 further includes two elastic members 150, where one of the elastic members 150 is connected between a structure of the casing 110 (indicated by the dashed lines) and the first hook 132 to provide an elastic force along the opposite direction of the first direction D1 (i.e., the second direction D2), and the other elastic member 150 is connected between a structure (indicated by the dashed line) of the casing 110 and the second hook 130 to provide an elastic force along the first direction D1. The two elastic members 150 are adapted to return the first hook 132 and the second hook 130 to their positions. Thus, when the upper body 30 is inserted into the socket structure 100 and the first hook 132 and the second hook 130 are moved to the fixed positions on both sides at the locked position P1, the user does not need to control the switch 120 manually to return the first hook 132 and the second hook 130 to their positions, which is quite convenient in operation.

Figure 4:
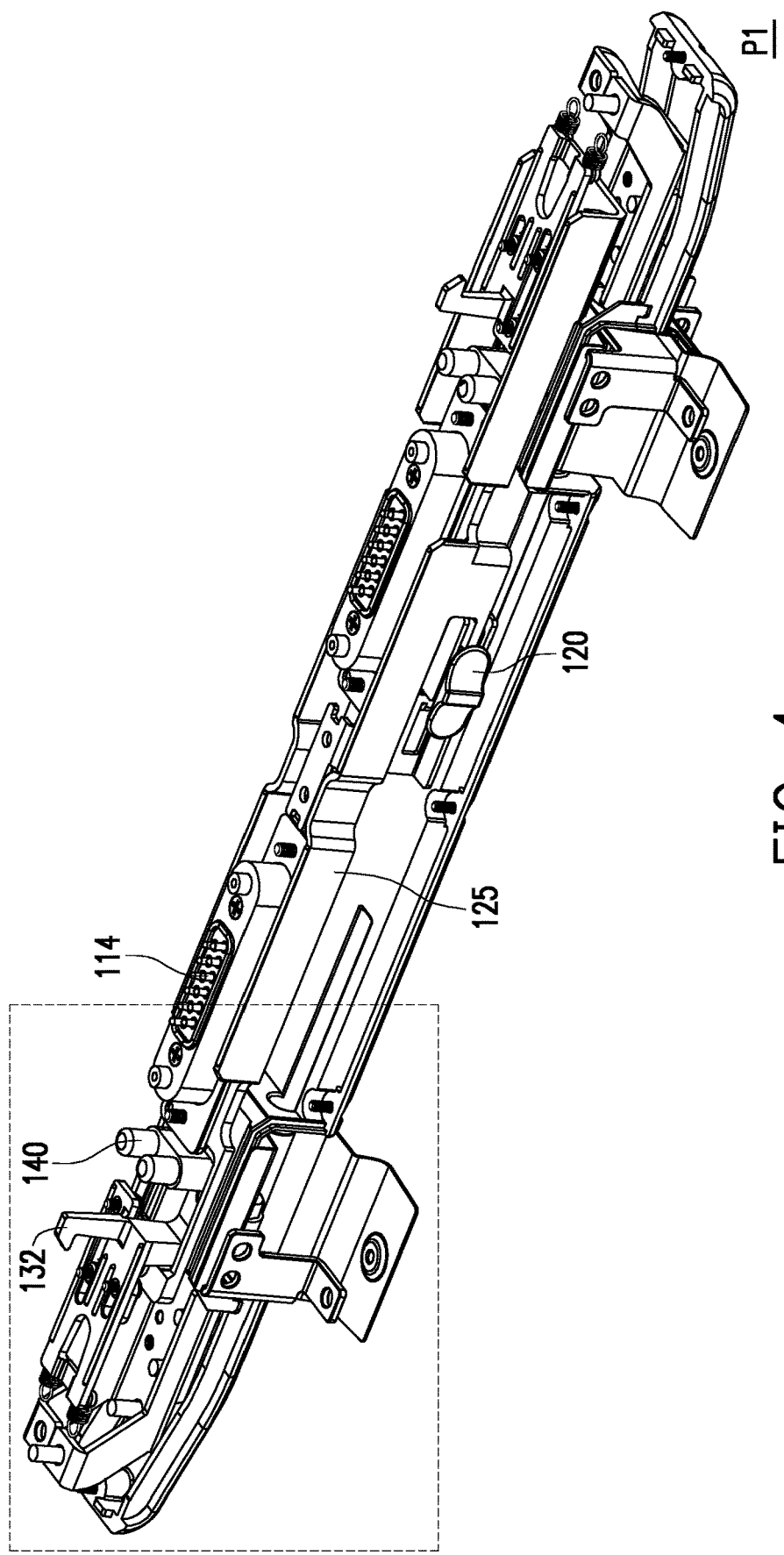
FIG. 4 is a schematic view where the socket structure of FIG. 1 is hidden.
Figure 5A:
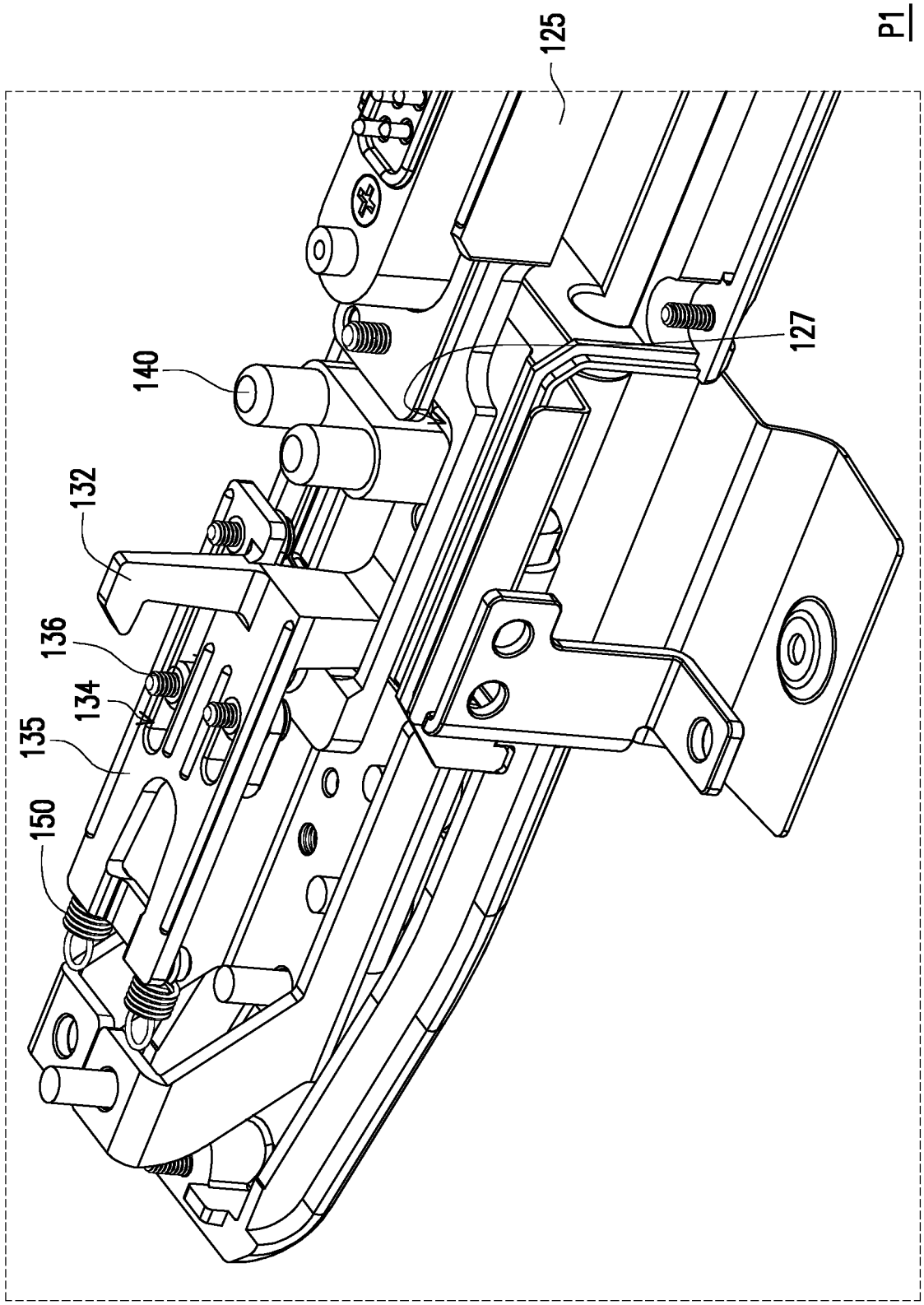
FIG. 5A is a partial enlarged schematic view of FIG. 4.
Figure 5B:
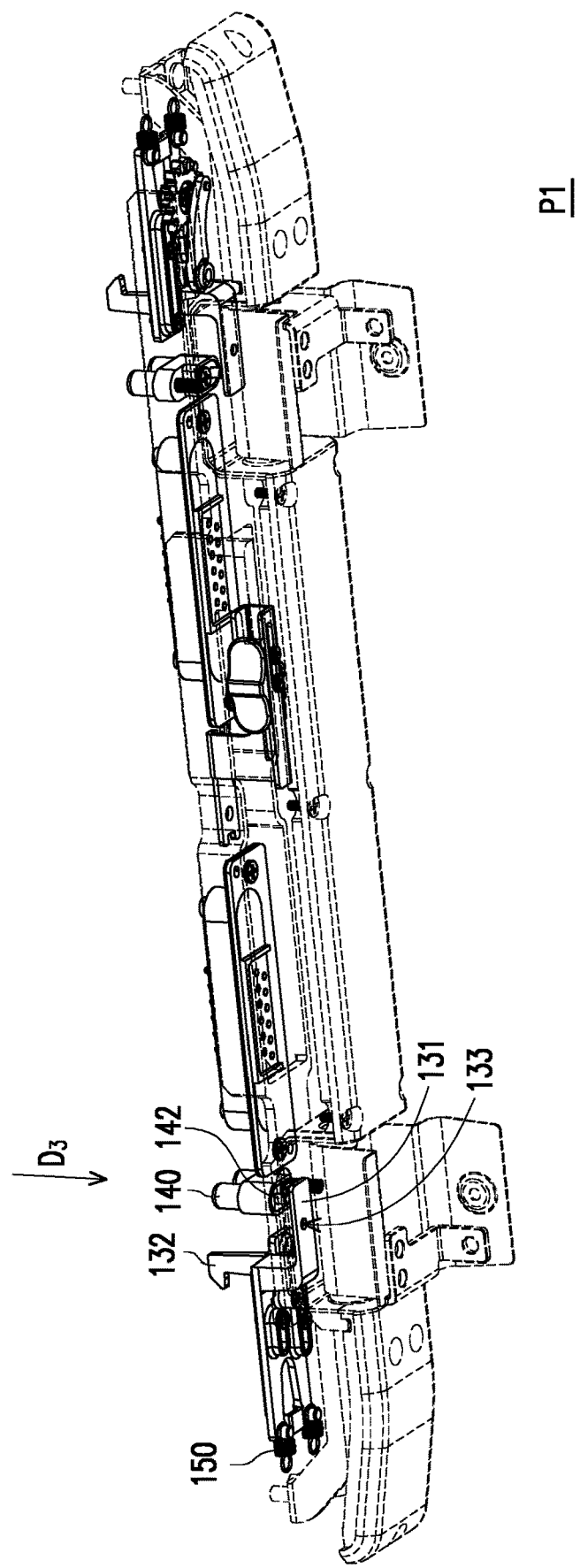
FIG. 5B is a schematic view of FIG. 5A from another angle.
Figure 6A:
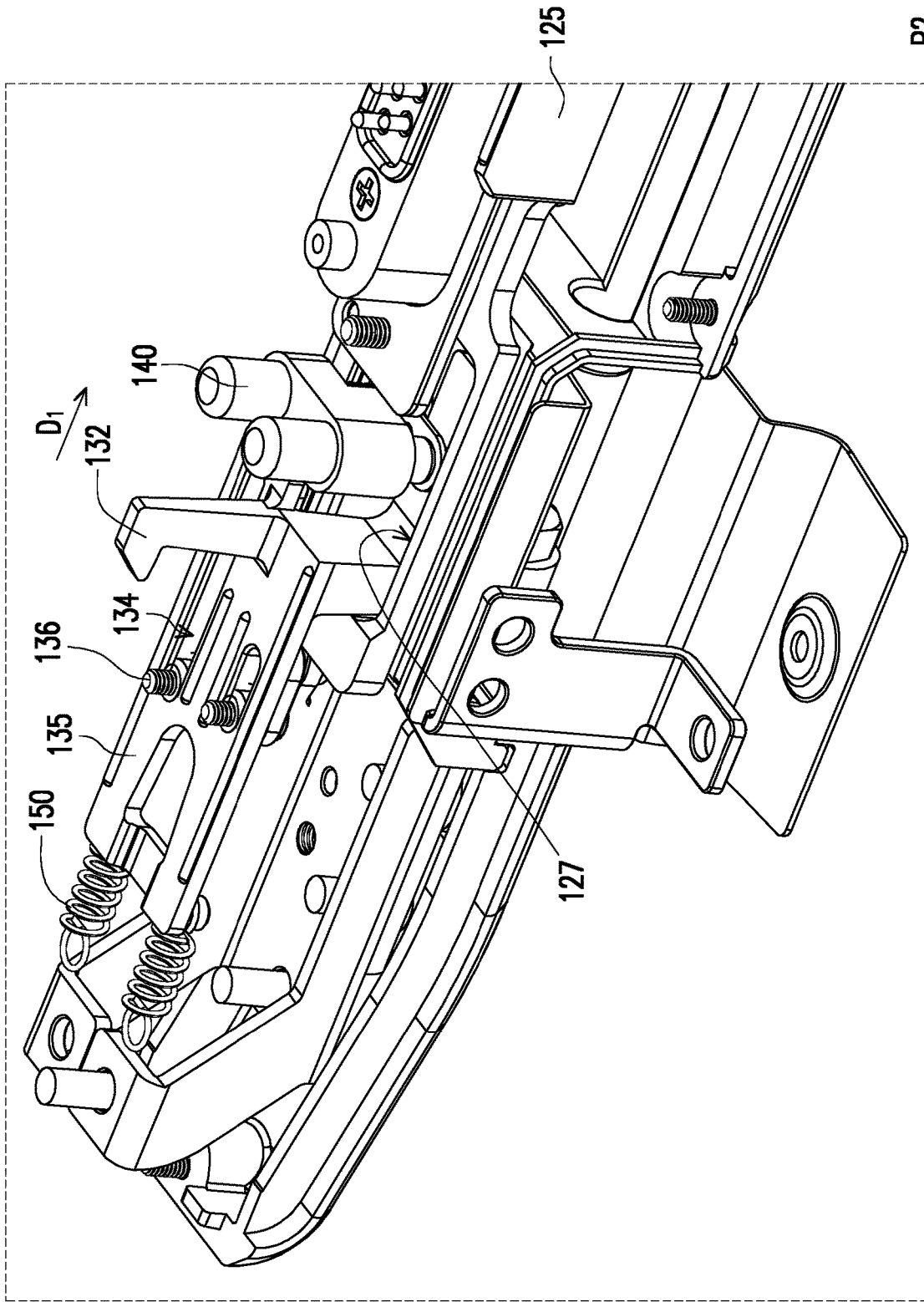
FIG. 6A is a schematic view of the first hook of FIG. 5A in an unlocked position.
Figure 6B:
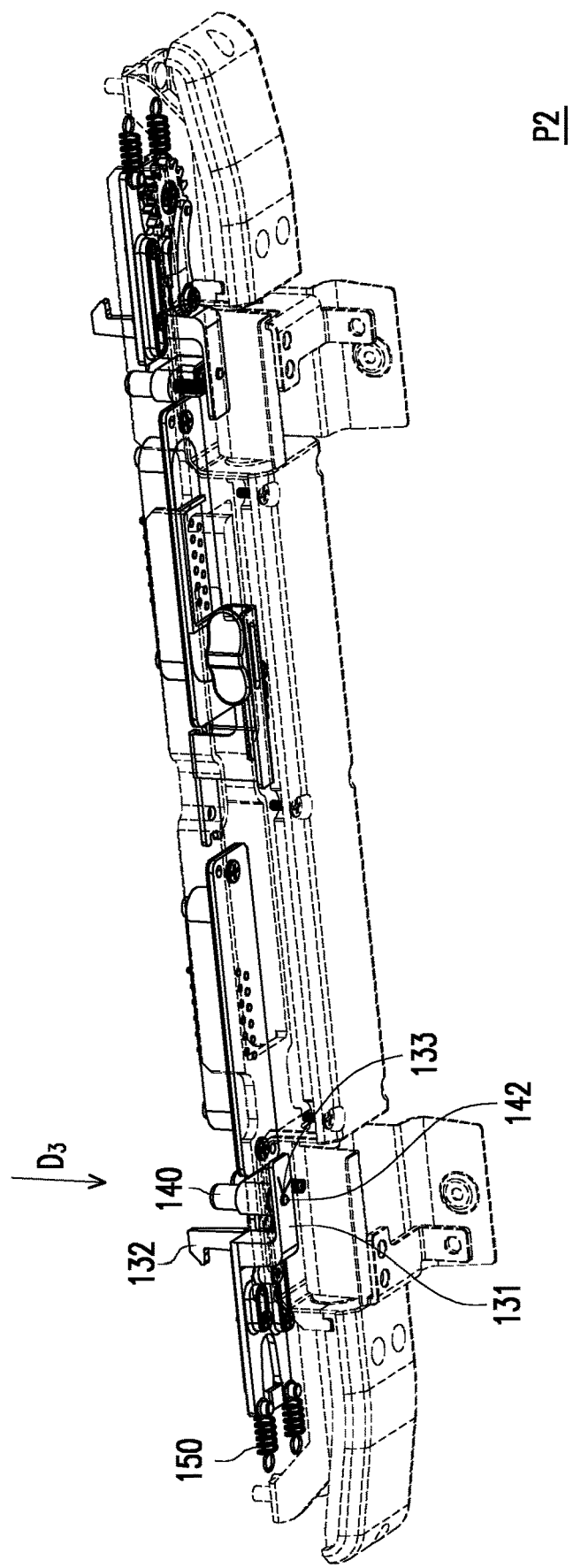
FIG. 6B is a schematic view of FIG. 6A from another angle.

The following description first describes the linkage relation between the first hook 132 and the switch 120. FIG. 4 is a schematic view where the socket structure of FIG. 1 is hidden. FIG. 5A is a partial enlarged schematic view of FIG. 4. FIG. 5B is a schematic view of FIG. 5A from another angle. FIG. 6A is a schematic view of the first hook of FIG. 5A in an unlocked position. FIG. 6B is a schematic view of FIG. 6A from another angle. Note that in order to see the internal structure clearly, the casing 110 is hidden here. Although one end of the elastic member 150 is not shown to be connected to the structure in FIG. 4 to FIG. 6B, it is actually connected to the hidden casing 110.

Please refer to FIG. 4 to FIG. 6B. In this embodiment, a socket structure 100 includes a linkage 125. The linkage 125 is located in the casing 110 and linked to a switch 120. A first hook 132 is linked to the linkage 125. Specifically, in this embodiment, the linkage 125 includes an opening 127, the first hook 132 has an extending bottom plate 131 located in the opening 127, and the extending bottom plate 131 abuts the linkage 125. Therefore, when the linkage 125 moves, the extending bottom plate 131 is pushed directly, and the first hook 132 thereby moves in the same direction.

In addition, in order for the first hook 132 to move stably along a first direction D1 without swaying laterally, in this embodiment, the socket structure 100 further includes a first guiding plate 135 and a guiding block 136. The first guiding plate 135 is connected to the first hook 132. The first guiding plate 135 has a first guiding groove 134, and the first guiding groove 134 extends along the first direction D1. The first guiding block 136 is fixed to the casing 110 and extends into the first guiding groove 134. Such configuration enables the first hook 132 to move stably along a single axis, avoiding it to wobble and fail to be locked with the upper body 30.

Figure 7A:
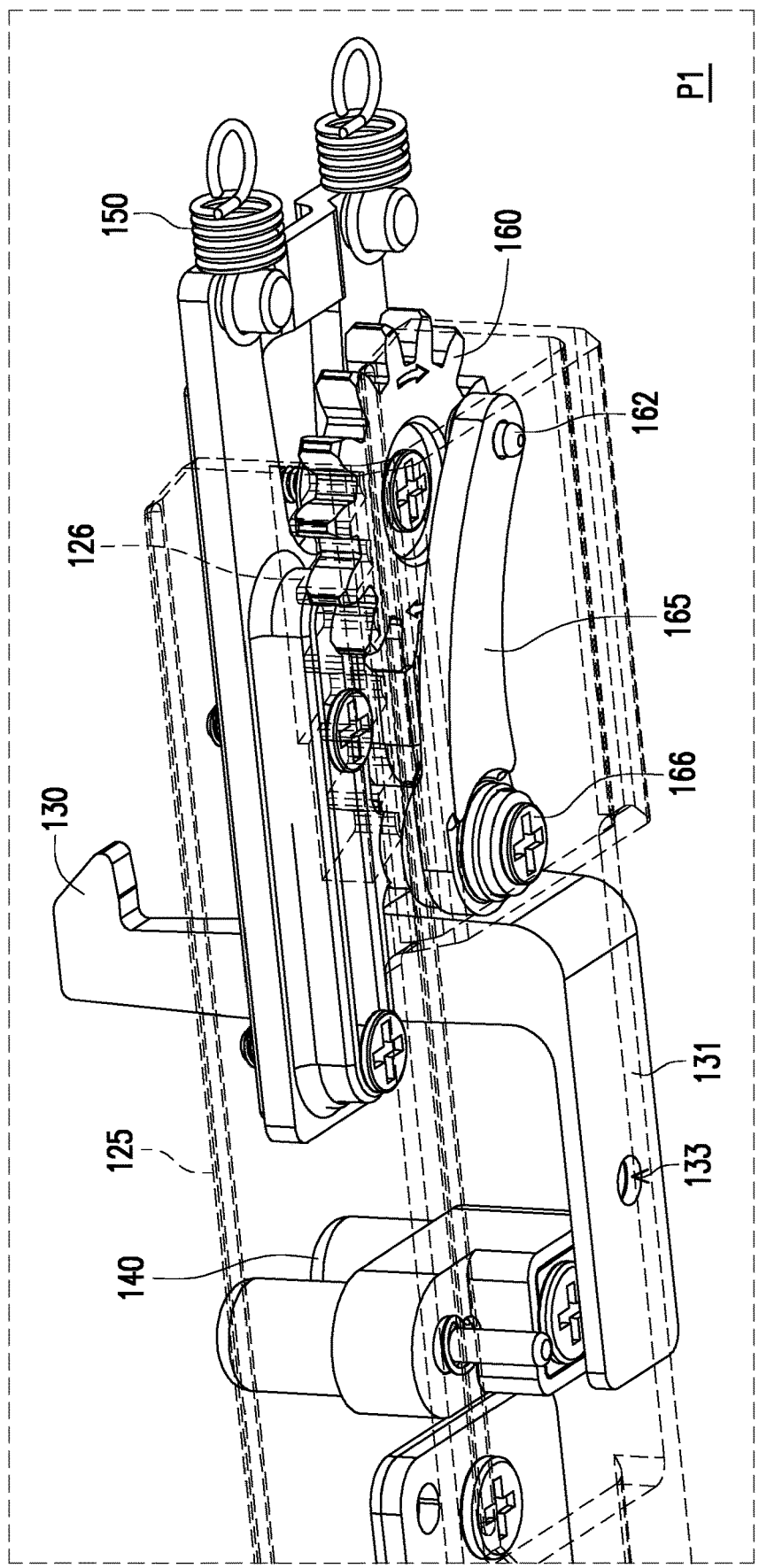
FIG. 7A to FIG. 7C are partial enlarged schematic views of the second hook of FIG. 4 at a fixed position from different angles.
Figure 7B:
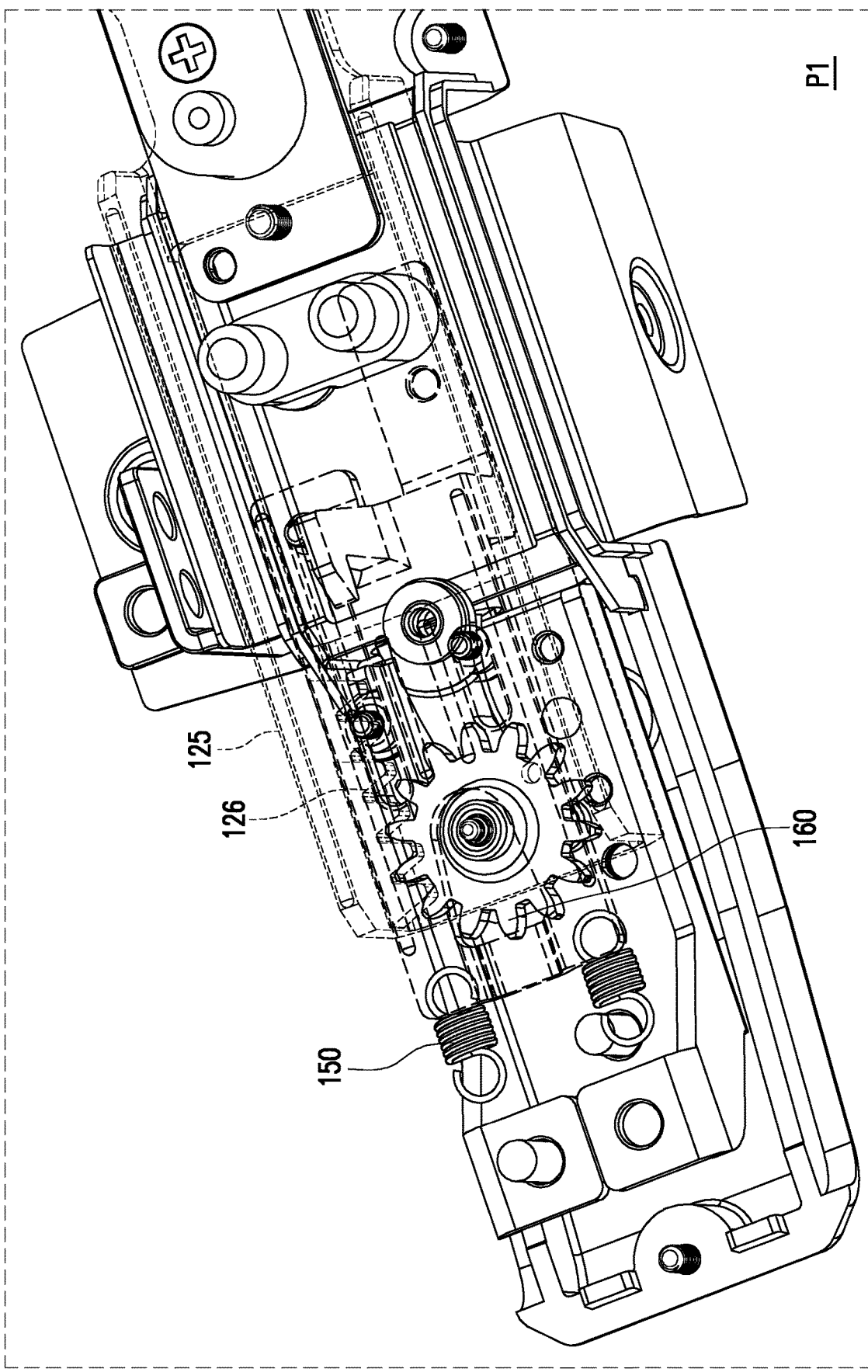
Figure 7C:
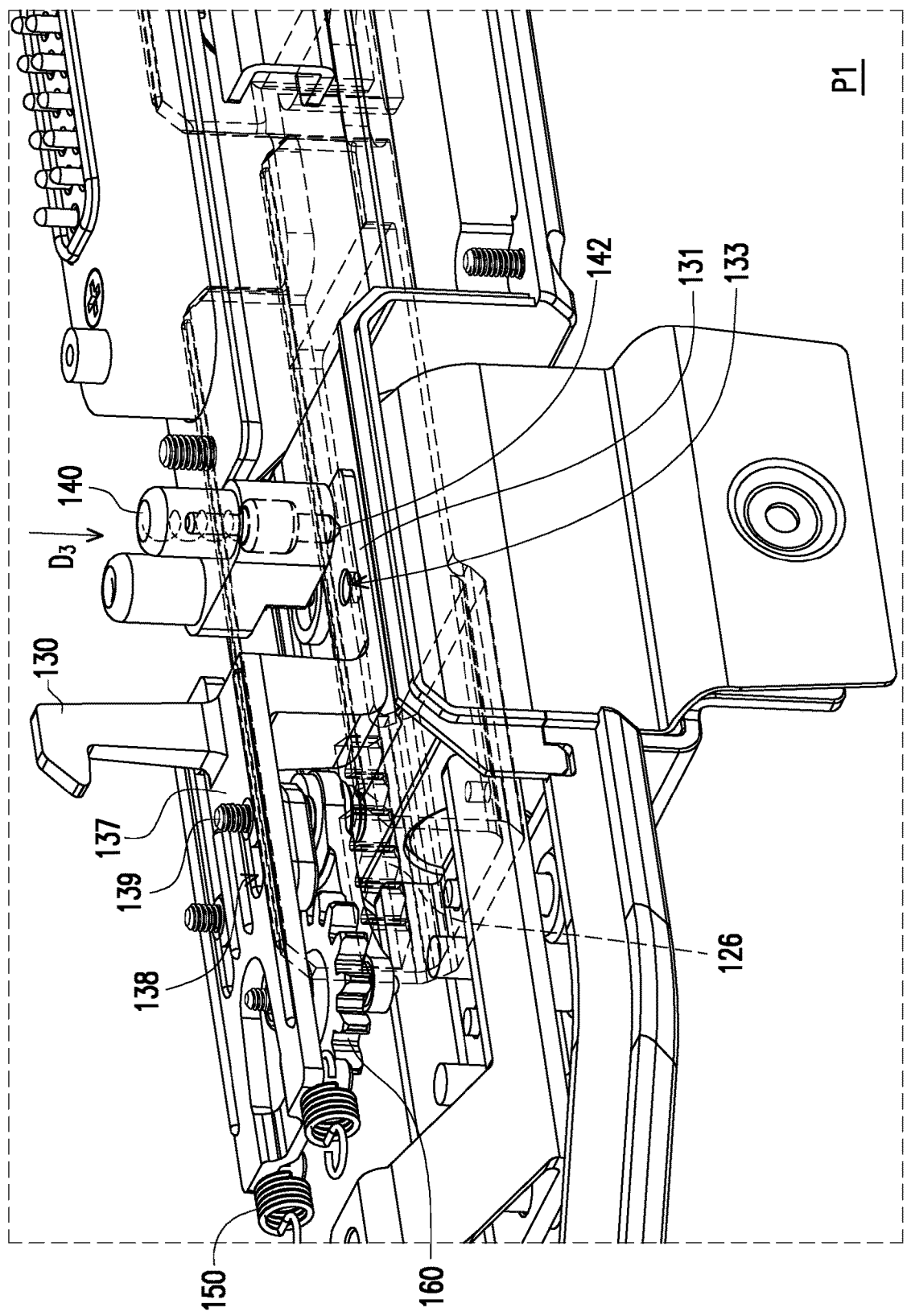
Figure 8A:
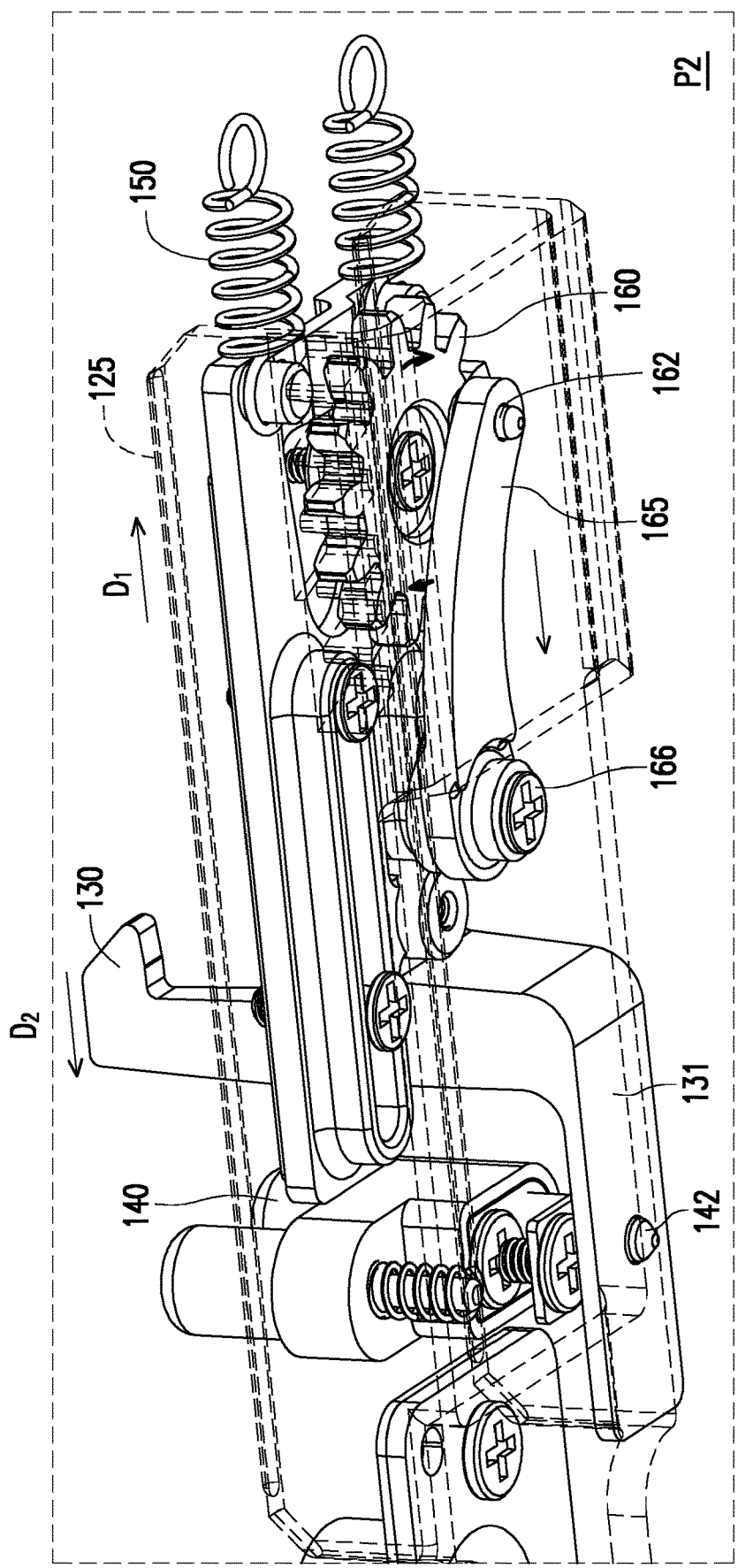
FIG. 8A to FIG. 8C are partial enlarged schematic views of the second hook of FIG. 4 in the unlocked position from different angles.
Figure 8B:
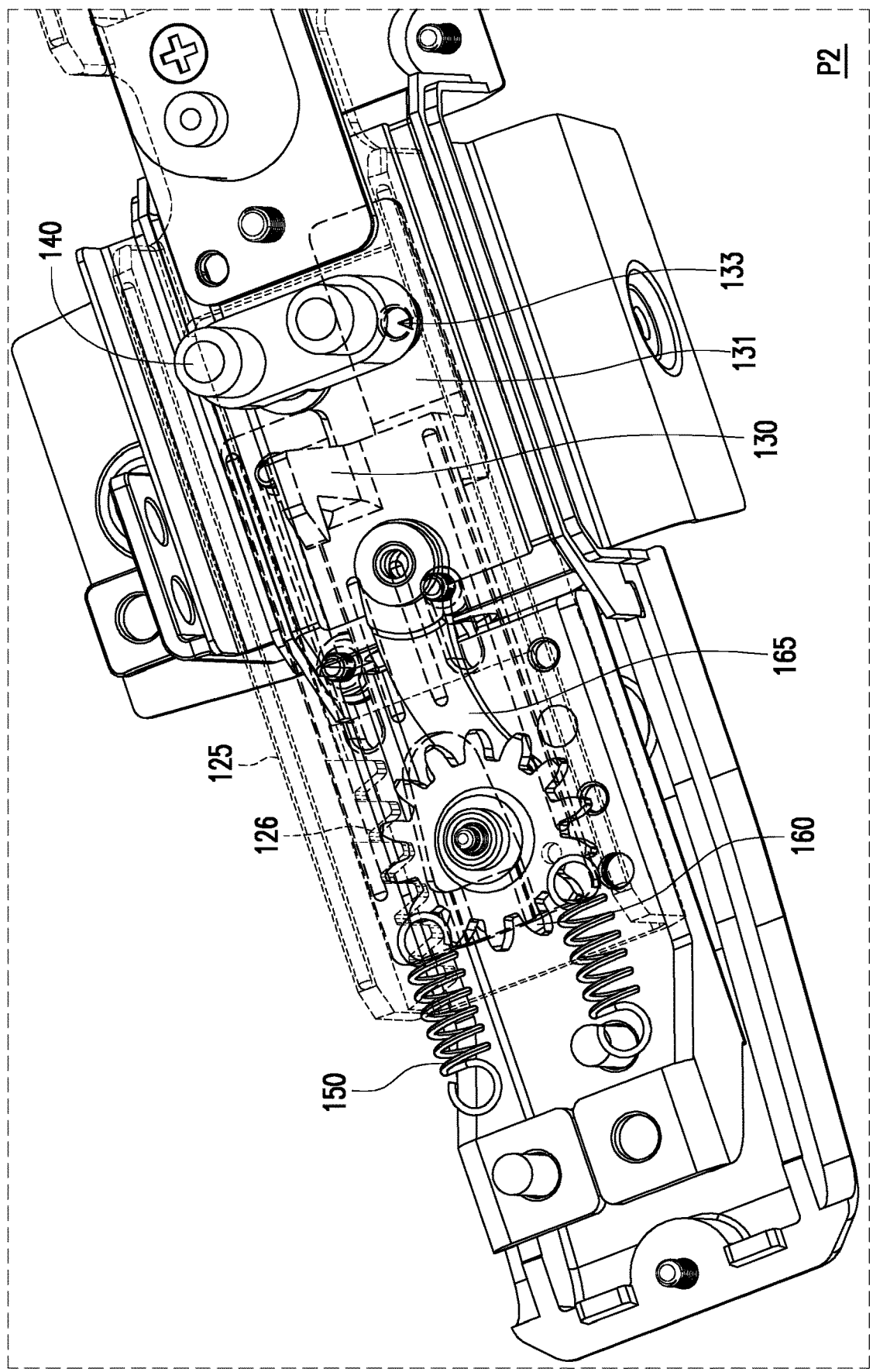
Figure 8C:
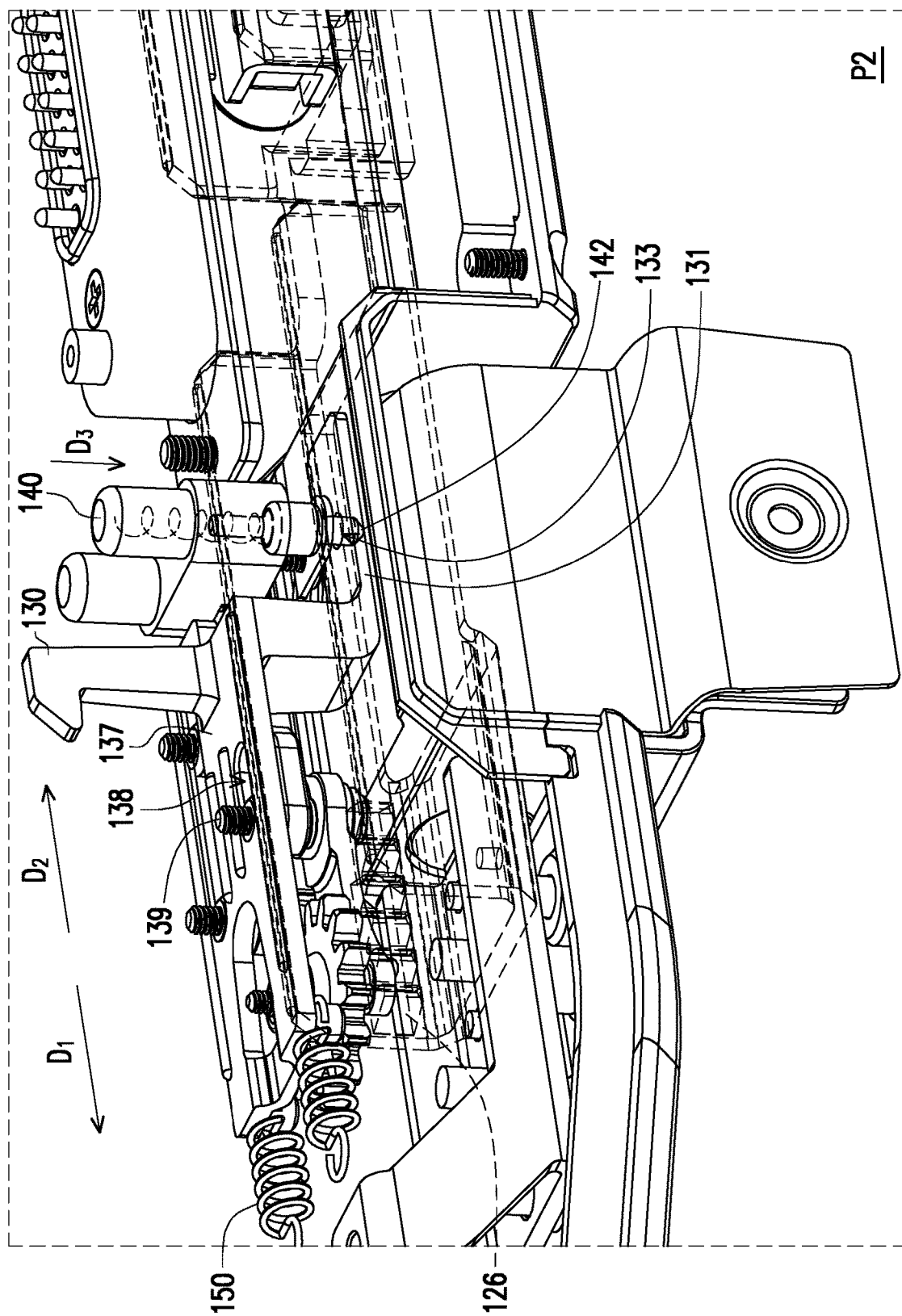

The following description describes the reverse linkage relation between the second hook 130 and the switch 120. FIG. 7A to FIG. 7C are partial enlarged schematic views of the second hook of FIG. 4 at a fixed position from different angles. FIG. 8A to FIG. 8C are partial enlarged schematic views of the second hook of FIG. 4 in the unlocked position from different angles. Note that in order to see the internal structure clearly, the casing 110 is hidden here. Although one end of the elastic member 150 is not shown to be connected to the structure in FIG. 7A to FIG. 8C, it is actually connected to the hidden casing 110.

Please refer to FIG. 7A to FIG. 8C. In this embodiment, a socket structure 100 further includes a gear 160 and a rotating arm 165. A linkage 125 has a rack 126 inside. The gear 160 is located in the casing 110 and engages with the rack 126. The rotating arm 165 is located in the casing 110 and one end is connected pivotally to a protrusion 162 of the gear 160, and the other end of the rotating arm 165 is linked to the second hook 130. In this embodiment, the other end of the rotating arm 165 is fixed to the second hook 130, for example, through a fastener 166. In other embodiments, the other end of the rotating arm 165 may also be integrated with the second hook 130.

When the switch 120 (FIG. 3) moves along a first direction D1, the linkage 125 moves correspondingly in the first direction D1, and the gear 160 rotates along with the moving rack 126 of the linkage 125, driving the rotating arm 165 to move in a substantially opposite direction as shown in FIG. 7A to FIG. 8A, so that the second hook 130 moves in the opposite direction of the first direction D1 (the second direction D2).

Similarly, in order to enable the second hook 130 to move stably along a second direction D2 without swaying laterally, in this embodiment, the socket structure 100 further includes a second guiding plate 137 (FIG. 7C) and a second guiding block 139 (FIG. 7C). The second guiding plate 137 is connected to the second hook 130. The second guiding plate 137 has a second guiding groove 138, and the second guiding groove 138 extends along the second direction D2. The second guiding block 139 is fixed to the casing 110 and extends into the second guiding groove 138. This way, even if the rotating arm 165 does not completely move along the second direction D2, the second hook 130 may move stably along a single axis, avoiding it to wobble and fail to be locked with the upper body 30.

In addition, the second hook 130 has the extending bottom plate 131, and the socket structure 100 further includes pogo pins 140 located in the groove 112 and respectively abutting against the extending bottom plate 131. The pogo pins 140 are located in the casing 110 so as to be movable upward and downward. When the pogo pins 140 are pressed by the upper body 30 in a vertical direction D3, springs in the pogo pins 140 are compressed, and the plungers 142 of the pogo pins 140 still abut against the extending bottom plate 131.

Take the embodiment of FIG. 7C and FIG. 8C as an example. The extending bottom plate 131 has a hole 133. When the pogo pins 140 are pressed in the vertical direction D3 that is perpendicular to the second direction D2, and the second hook 130 moves from the fixed position P1 to the unlocked position P2, the extending bottom plate 131 moves relative to the pogo pins 140, so that the hole 133 moves to a position corresponding to the pogo pin 140. At this time, the spring in the pogo pin 140 is released, and the plunger 142 of the pogo pin 140 extends into the hole 133, fixing the extending bottom plate 131 temporarily, and the second hook 130 is thereby fixed temporarily.

Similarly, as shown in FIG. 5B and FIG. 6B, when the pogo pins 140 are pressed in the vertical direction D3 that is perpendicular to the first direction D1, and the first hook 132 moves from the fixed position P1 to the unlocked position P2, the extending bottom plate 131 moves relative to the pogo pins 140 to place the hole 133 to a position corresponding to the pogo pin 140. At this time, the spring in the pogo pin 140 is released, and the plunger 142 of the pogo pin 140 extends into the hole 133, fixing the extending bottom plate 131 temporarily, and the first hook 132 is thereby fixed temporarily.

In this embodiment, when the second hook 130 is at the fixed position P1, the elastic members 150 have not been stretched yet; and when the user moves the switch 120 to relocate the second hook 130 from the fixed position P1 and place it to the unlocked position P2, the elastic members 150 are elongated to accumulate elastic potential energy. In this state, the plunger 142 of the pogo pin 140 extends into the hole 133, so that the elastic members 150 remain temporarily in an elongated state. Therefore, the second hook 130 stays in the unlocked position P2. Similarly, in this embodiment, the first hook 132 also has an extending bottom plate 131, the corresponding pogo pin 140, and the corresponding elastic members 150, so that the first hook 132 may remain in the unlocked position P2.

Therefore, when the user moves the switch 120 from the left (FIG. 2) to the right (FIG. 3) in the first direction D1, the first hook 132 and the second hook 130 remain in the unlocked position P2, fixing the switch 120 in the position of FIG. 3 (on the right), such that the user does not need to apply continuous pressure to maintain the switch 120 in the position of FIG. 3. Such configuration increases the ease of use greatly.

Later, when the user detaches the upper body 30 from the groove 112, the pogo pins 140 are no longer pressed and may move upward as a whole, the plunger 142 leaves the hole 133 of the extending bottom plate 131, and the first hook 132 and the second hook 130 are pulled back by the two elastic members 150.

Specifically, when the two pogo pins 140 move upward, which is the opposite direction of the vertical direction D3, the two pogo pins 140 leave the two holes 133 of the two extending bottom plates 131, so that the first hook 132 and the second hook 130 are not restricted. At this time, the elastic members 150 close to the second hook 130 release the elastic potential, so that the second hook 130 moves in the first direction D1. In addition, the elastic members 150 close to the first hook 132 release the elastic potential, driving the first hook 132 to move in the second direction D2, causing the first hook 132 and the second hook 130 to move from the unlocked position P2 to the fixed position P1. During this process, the gear 160 rotates along with the movement of the rotating arm 165 to drive the rack 126 to move, and the linkage 125 moves to return the switch 120 to its original position.

It is worth mentioning that in this embodiment, the socket structure 100 is normally located at the fixed position P1. However, in other embodiments, the socket structure can also be as follows: when the first hook 132 and the second hook 130 are located in the fixed position P1, the two elastic members 150 are elongated, and the plunger 142 of the pogo pin 140 is configured to extend into the hole 133, so that the socket structure 100 is normally located at the unlocked position P2. The configuration of the socket structure is not limited by the drawings.

In sum, the switch of the socket structure of the present disclosure is linked to the first hook through the linkage, so that the first hook is capable of moving in the same direction with the switch. Also, through the rack on the linkage, the gear engaged with the rack, and the rotating arm pivoted to the gear, the switch drives the second hook to move in the opposite direction with the switch. This way, the socket structure of the present disclosure is capable of controlling the first hook and the second hook to move in opposite direction with a single switch, which is a configuration not only facilitating the operation of users, but also providing a two-way fixation to improve the fixation. Furthermore, with the above configuration of the socket structure, the user can remove or assemble the upper body with one hand, and there is no need to apply continuous pressure or operate any components during the removal of the upper body. Also, when the upper body is removed, the first hook and the second hook automatically return to the fixed positions, and the upper body can be directly inserted into the socket structure during the next assembly. Such one-handed operation increases the ease of use.

What is claimed is:

1. A socket structure, comprising:
   a casing;
   a switch, disposed movably to the casing along a first direction or a second direction;
   a linkage, located in the casing and linked to the switch, wherein the linkage comprises a rack;
   a first hook, exposed from the casing and linked to the linkage;
   a gear, located in the casing and adapted to engage with the rack;
   a rotating arm, located in the casing, wherein one end of the rotating arm is pivotally connected to the gear; and
   a second hook, exposed from the casing and linked to an other end of the rotating arm, wherein
   when the switch moves along the first direction, the linkage moves correspondingly along the first direction, the first hook is driven to move along the first direction, the gear rotates along with a movement of the rack of the linkage and drives the rotating arm to move, the second hook moves toward the second direction, and the first hook and the second hook move from a fixed position to an unlocked position.

2. The socket structure according to claim 1, wherein the first hook comprises a first extending bottom plate, the second hook comprises a second extending bottom plate, and the socket structure further comprises two pogo pins located in the casing and respectively abut against the first extending bottom plate and the second extending bottom plate.

3. The socket structure according to claim 2, wherein the first extending bottom plate comprises a first hole and the second extending bottom plate comprises a second hole; when the two pogo pins are pressed in a vertical direction and the first hook and the second hook are moved to the unlocked position, the first extending bottom plate and the second extending bottom plate move relative to the two pogo pins, so that the two holes are moved to positions corresponding to the two pogo pins, and the two pogo pins are inserted into the first hole and the second hole, respectively.

4. The socket structure according to claim 3, wherein when the two pogo pins move upward as in an opposite direction of the vertical direction, the two pogo pins leave the first hole and the second hole, respectively, the first hook moves along the second direction, and the second hook moves toward the first direction, the gear rotates along with a movement of the rotating arm and drives the rack to move, and the first hook and the second hook are moved from the unlocked position to the fixed position.

5. The socket structure according to claim 1, further comprising a first guiding plate and a first guiding block, wherein the first guiding plate is connected to the first hook, the first guiding plate comprises a first guiding groove, and the first guiding block is fixed to the casing and is adapted to extend into the first guiding groove.

6. The socket structure according to claim 1, further comprising a second guiding plate and a second guiding block, wherein the second guiding plate is connected to the second hook, the second guiding plate comprises a second guiding groove, and the second guiding block is fixed to the casing and is adapted to extend into the second guiding groove.

7. The socket structure according to claim 1, wherein the linkage comprises an opening, the first hook comprises an extending bottom plate located in the opening, and the extending bottom plate abuts against the linkage.

8. The socket structure according to claim 1, wherein the other end of the rotating arm is fixed to the second hook, or the other end of the rotating arm is integrated with the second hook.

9. The socket structure according to claim 1, further comprising a first elastic member and a second elastic member, wherein the first elastic member is connected between the casing and the first hook and is adapted to provide an elastic force in the second direction, and the second elastic member is connected between the casing and the second hook and is adapted to provide an elastic force in the first direction.

10. The socket structure according to claim 1, further comprising an electrical connector exposed from the casing.

11. The socket structure according to claim 1, further comprising a hinge assembly disposed in the casing.

12. A portable electronic device, comprising:
    a lower body;
    a socket structure, connected to the lower body and comprising:
    a casing;
    a switch, exposed and disposed movably to the casing along a first direction or a second direction;
    a linkage, located in the casing and linked to the switch, and comprising a rack;
    a first hook, exposed from the casing and linked to the linkage;
    a gear, located in the casing and adapted to engage with the rack;
    a rotating arm, located in the casing, wherein one end of the rotating arm is pivotally connected to the gear; and
    a second hook, exposed from the casing and linked to an other end of the rotating arm, wherein when the switch moves along the first direction, the linkage moves correspondingly along the first direction, the first hook is driven to move in the first direction, the gear rotates with a movement of the rack of the linkage and drives the rotating arm to move, the second hook moves toward the second direction, and the first hook and the second hook are moved from a fixed position to an unlocked position; and an upper body, disposed detachably in a groove of the socket structure, and the first hook and the second hook are suitable for being buckled or detached from the upper body.

13. The portable electronic device according to claim 12, wherein the first hook comprises a first extending bottom plate, the second hook comprises a second extending bottom plate, and the socket structure further comprises two pogo pins located in the casing and respectively abut against the first extending bottom plate and the second extending bottom plate.

14. The portable electronic device according to claim 13, wherein the first extending bottom plate comprises a first hole and the second extending bottom plate comprises a second hole; when the two pogo pins are pressed in a vertical direction and the first hook and the second hook are moved to the unlocked position, the first extending bottom plate and the second extending bottom plate move relative to the two pogo pins, so that the two holes are moved to positions corresponding to the two pogo pins, and the two pogo pins are inserted into the first hole and the second hole, respectively.

15. The portable electronic device according to claim 14, wherein when the two pogo pins move upward as in an opposite direction of the vertical direction, the two pogo pins leave the first hole and the second hole, respectively, the first hook moves along the second direction, and the second hook moves toward the first direction, the gear rotates along with a movement of the rotating arm and drives the rack to move, and the first hook and the second hook are moved from the unlocked position to the fixed position.

16. The portable electronic device according to claim 12, wherein the socket structure further comprises a first guiding plate and a first guiding block, the first guiding plate is connected to the first hook, the first guiding plate comprises a first guiding groove, and the first guiding block is fixed to the casing and is adapted to extend into the first guiding groove.

17. The portable electronic device according to claim 12, wherein the socket structure further comprises a second guiding plate and a second guiding block, the second guiding plate is connected to the second hook, the second guiding plate comprises a second guiding groove, and the second guiding block is fixed to the casing and is adapted to extend into the second guiding groove.

18. The portable electronic device according to claim 12, wherein the linkage comprises an opening, the first hook comprises an extending bottom plate located in the opening, and the extending bottom plate abuts against the linkage.

19. The portable electronic device according to claim 12, wherein the other end of the rotating arm is fixed to the second hook, or the other end of the rotating arm is integrated with the second hook.

20. The portable electronic device according to claim 12, wherein the socket structure further comprises a first elastic member and a second elastic member, wherein the first elastic member is connected between the casing and the first hook and is adapted to provide an elastic force in the second direction, and the second elastic member is connected between the casing and the second hook and is adapted to provide an elastic force in the first direction.

21. The portable electronic device according to claim 12, wherein the socket structure further comprises an electrical connector exposed from the casing.

22. The portable electronic device according to claim 12, wherein the socket structure further comprises a hinge assembly disposed in the casing and connected to the lower body.

* * * * *